United States Patent [19]

Blyakhman

[11] Patent Number: 5,464,702
[45] Date of Patent: Nov. 7, 1995

[54] HIGH PERFORMANCE EPOXY RESIN SYSTEMS CONTAINING TRIMETHYLQUINOLINE OLIGOMERS

[75] Inventor: Yefim Blyakhman, Bronx, N.Y.

[73] Assignee: Ciba-Geigy Corporation, Tarrytown, N.Y.

[21] Appl. No.: 320,092

[22] Filed: Oct. 7, 1994

[51] Int. Cl.[6] .................... C08G 59/40; C08G 65/00
[52] U.S. Cl. ............... 428/413; 525/504; 528/97; 528/99; 528/109; 528/118; 528/361; 528/407
[58] Field of Search .................. 528/97, 99, 109, 528/118, 361, 407; 525/504; 428/413

[56] References Cited

U.S. PATENT DOCUMENTS

| | | | |
|---|---|---|---|
| 2,773,048 | 12/1956 | Formo et al. | 528/124 |
| 4,427,802 | 1/1984 | Moulton et al. | 528/118 |

OTHER PUBLICATIONS

Derwent Abstract 70–61842R/35: "Cycloaliphatic Epoxy Resins of Greater Age Resistance".
Chemical Abstracts 82:141101: "Stabilized Epoxy Resins".
Derwent Abstract 87–392667/47: "Epoxy–Based, Polymercaptan Crosslinked Bonding and Sealing Agent".
I. W. Elliott, Jr. et al. Tetrahedron, vol. 19 pp. 833–838 (1963).
Obouskayer, A. et al. Kristallografiia/Akademiia Nauk. SSSR V. 35(3) 687–92 (1990).
D. Craig, The Journal of the Amer. Chem. Soc. vol. 60 (1938) pp. 1458–1465.
Knövenagel, Ber, 54B, 1722 (1921).

*Primary Examiner*—Frederick Krass
*Attorney, Agent, or Firm*—Luther A. R. Hall

[57] ABSTRACT

Oligomerized 1,2-dihydro-2,2,4-trimethylquinoline is an effective curing agent for epoxy resins to give products with high glass transition temperatures, low water absorption and excellent retention of hot/wet physical properties. These cured epoxy resins find use as matrix resins, in laminates, adhesives, coatings and in electrical applications.

11 Claims, No Drawings

HIGH PERFORMANCE EPOXY RESIN SYSTEMS CONTAINING TRIMETHYLQUINOLINE OLIGOMERS

This invention pertains to epoxy resins cured with oligomerized 1,2-dihydro- 2,2,4-trimethylquinoline (OTMQ) and to the method of curing epoxy resins using OTMQ.

BACKGROUND OF THE INVENTION 1,2-Dihydro-2,2,4-trimethylquinoline is prepared by the condensation of one equivalent of aniline with two equivalents of acetone in the presence of acid catalysts as first described by Knövenagel, Ber., 54B, 1722 (1921 ). The compound, also called "acetone anil" is a low melting (26°–27° C.) solid which undergoes oligomerization when heated with acid. The pure dimer, melting at 96°–97° C., was obtained by D. Craig, J. Am. Chem. Soc., 60, 1458 (1938) and its structure was suggested by I. W. Elliott et al. Tetrahedron, 19, 833 (1963). The formation of such a dimer is the result of the attack of a cation at the 6-position of the benzo ring which is activated by the nitrogen atom. The crystal and molecular structure of the dimer was confirmed by A. Obodovskaya et al., Kristallografiya, 35, N3,687 (1990). The dimer is monoclinic and non-planar.

Nitrogen in the tetrahydroquinoline portion of the dimer or oligomer has slightly higher basicity compared to that of the nitrogen in the dihydroquinoline portion of the dimer or oligomer ($pK_b$ 9.1 and 10.2 respectively). The bond between the two portions of the dimer is longer than normal so rotation around this bond is possible and formation of stereoisomers is possible. Packing of the dimer molecules is determined only by Van Der Waals forces. The oligomers are quite soluble in ketones, alcohols, aromatic hydrocarbons and other organic solvents.

The oligomers are commercially available and are widely used as antioxidants for rubbers and plastics. They also are used as corrosion inhibitors.

The oligomers are disclosed as additives for improving aging resistance of epoxy resins cured by anhydrides as seen in German Patent Nos. 1,906,126 and 2,331,718, and as additives for improving weather resistance and adhesion of epoxy adhesives cured with polymercaptans as seen in Hungarian Patent No. 43339. There is no disclosure that the oligomers can be used as curing agents for epoxy resins.

When the 1,2-dihydro-2,2,4-trimethylquinoline is oligomerized, the product is a complex mixture of individual oligomers which can be identified in commercial samples of the oligomer product by gel permeation chromatography (GPC). Individual oligomers up to the hexamer were identified by A. Krishen et al., Anal. Chem., 49 (7), 896 (1971).

DETAILED DISCLOSURE

The instant invention pertains to curable epoxy resin compositions which comprise (a) an epoxy resin having at least two epoxy groups, and (b) an effective curing amount of a mixture of oligomeric 1,2-dihydro-2,2,4-trimethylquinolines (OTMQ).

Component (a) is an epoxy resin selected from the group consisting of the glycidyl ethers of polyhydric phenols, of aliphatic or cycloaliphatic alcohols, of 4,4'-dihydroxydiphenyl sulfone, of dihydroxynaphthalene; of the condensation products of phenols or cresols with formaldehyde; the glycidyl ethers of halogenated mono-, di- or polynuclear phenols; glycidylated amines, aminophenols and amides; glycidylated polyacids; cycloaliphatic epoxy resins having epoxy groups attached to cyclohexane or cyclopentane rings; and mixtures thereof.

Preferably, component (a) is the epoxy resin based on the diglycidyl ether of bisphenol A, the diglycidyl ether of bisphenol F, the diglycidyl ether of hydroquinone, of resorcinol, of catechol, of 2,5-dihydroxynaphthalene or of 9,9-bis(4-hydroxyphenyl)fluorene; the tetraglycidyl ether of 3,3,3',3'-tetramethyl- 1,1'-spirobisindane-5,5',6,6'-tetraol; the tetraglycidyl derivatives of methylenedianiline, of m-phenylenediamine, of 1,4-di-(α ,α-dimethyl-4-aminobenzyl)benzene, of 1,4-di(α,α-dimethyl-3-methyl-4-aminobenzyl)benzene or of 3,3'-diethyl-4,4'-diaminodiphenylmethane; the triglycidyl derivatives of 4-aminophenol or 3-methyl-4-aminophenol; the diglycidyl derivative of aniline; di(2-glycidyl-oxy- 1-naphthyl)methane, di(2,5-diglycidyloxy-1-naphthyl)methane or 2-glycidyloxy-1-naphthyl- 2',5'-diglycidyloxy-1'-naphthyl-methane.

Most preferably, component (a) is an epoxy resin which is the diglycidyl ether of bisphenol A, the diglycidyl ether of bisphenol F, the tetraglycidyl derivative of 3,3'-diethyl-4,4'-diaminodiphenylmethane or mixtures thereof.

The hardeners of component (b) are used in an amount which is 50–150 % of stoichiometric amount which is 1:1 ratio of active hydrogen and epoxy groups. Thus, the effective amount of a hardener of component (b) is from 0.5 to 1.5 equivalents of —NH— for each equivalent of epoxy moiety.

Epoxy resins cured by the instant compounds of component (b) are particularly useful in the production of composites, adhesives, molding compounds, potting compounds, coatings and wide variety of other utilities for which epoxy resins are especially suited. The instant compositions are particularly effective for preparing matrix resins for automated processes in composite manufacture involving filament winding, etc.

The instant oligomers (OTMQ) are excellent curing agents for epoxy resins because of the following features:

1. the polycyclic bulky backbone contains no polar groups except for a limited number of —NH— moieties;

2. the concentration of active hydrogen is very low;

3. there are no primary amino groups, and all active —NH— groups are secondary;

4. the nitrogen atoms of the —NH— groups are intraring moieties unlike common aromatic and cycloaliphatic amine hardeners where the amino or —NH— groups are extraring moieties; and 5. the nitrogen atoms of the —NH— groups are blocked sterically by the two methyl groups in the 2-position.

Accordingly, it would be contemplated that epoxy resins cured by these oligomers would have the following advantages:

a. low crosslinking density and hence low shrinkage and low stresses as a result of curing;

b. high glass transition temperature, $T_g$;

c. low water absorption and hence good retention of physical properties under hot/wet conditions; and d. low dielectric constant, Dk.

Additionally the oligomers have the advantage of a combination of relatively low cost and low toxicity. The oligomers have a long history of use as antioxidants in industrial applications. The toxicity of the oligomers is quite low compared to many amine hardeners of other structures.

The instant invention also pertains to a process of curing an epoxy resin having at least two epoxy groups by incorporating therein an effective curing amount of a mixture of oligomeric 1,2-dihydro-2,2,4-trimethylquinolines (OTMQ).

Additionally, another object of the instant invention is to provide a curable epoxy resin composition which comprises (a) an epoxy resin having at least two epoxy groups; and (b) an effective curing amount of a mixture of (i) oligomeric 1,2-dihydro-2,2,4-trimethylquinoline (OTMQ), and (ii) an aromatic, cycloaliphatic or polyamine containing at least two NH groups, where the OTMQ content of component (b) is 5 to 95% by weight of the mixture of component (b).

Examples of aromatic and cycloaliphatic amines which can be used as component (ii) in combination with OTMQ are 4,4'-diaminodiphenylmethane, 4,4'-diaminodiphenyl sulfone, 3,3'-diaminodiphenyl sulfone, m-phenylenediamine, p-phenylenediamine, toluenediamine, diaminonaphthalene, 1,2-diaminocyclohexane, 4,4'-diaminodicyclohexylmethane and 3,3'-dimethyl- 4,4'-diaminodicyclohexylmethane.

This use of OTMQ in combination with other aromatic or cycloaliphatic amines as the curing agents for epoxy resins allows for more flexibility in adjusting processing parameters and tailoring cured resin properties to specific desired requirements.

It is understood that in this invention other conventionally used additives for epoxy resin systems such as accelerators, tougheners, plasticizers, fillers, reinforcing agents, pigments and the like may also used.

The following examples are meant for illustrative purposes only and are not to be construed to limit the scope of the instant invention in any manner whatsoever.

While any of the oligomers of 1,2-dihydro-2,2,4-trimethylquinoline can be used successfully as curing agents for epoxy resins, the experimental results given below are carried out with the highest molecular weight oligomeric mixture which is currently available commercially as AGERITE®MA "resin" (antioxidant, R. T. Vanderbilt Co.). This material has a softening point in the range 115°–135° C. Analysis of this oligomeric mixture shows it to have a number average molecular weight of 628, a weight average molecular weight of 803 and a dispersity of 1.27. It is assumed that this oligomeric mixture is largely a tetramer (molecular weight 692). The structure of the tetramer as suggested by Elliott et al., loc cit. would be as follows:

To show the general applicability of the oligomeric 1,2-dihydro-2,2,4-trimethylquinoline as curing agents, commercially available AGERITE®MA, described above (ARMA), is used to cure a wide variety of epoxy resins as seen in the tables below.

The resins used are as follow:

Resin A—diglycidyl ether of bisphenol A, epoxy equivalent weight 185;

Resin B—diglycidyl ether of bisphenol F, epoxy equivalent weight 165;

Resin C—glycidyl ether of phenol novolac resin with 2.3 epoxy groups per mole, epoxy equivalent weight 175;

Resin D—diglycidyl ether of bisphenol A advanced with tetrabromobisphenol A, epoxy equivalent weight 430;

Resin E—brominated epoxy resin, epoxy equivalent weight 360;

Resin F—N,N'-tetraglycidyl-3,3'-diethyl-4,4'-diaminodiphenylmethane, epoxy equivalent weight 125;

Resin G—diglycidyl ether of 9,9-bis(4-hydroxyphenyl)fluorene, epoxy equivalent weight 275.

EXAMPLE 1

Reactivity of ARMA as a Curing Agent

In order to assess the reactivity of ARMA as a curing agent for epoxy resins, a number of different epoxy resins are cured with ARMA with a NH:Epoxy ratio of 0.87:1 and the gel time at 177° C. determined. The results are shown below.

| Epoxy Resin* | Gel Time at 177° C. |
| --- | --- |
| Resin A* | 12 min 16 sec |
| Resin B | 11 min 50 sec |
| Resin C | 8 min 55 sec |
| Resin D | 10 min 20 sec |
| Resin E | 20 min 10 sec |
| Resin F | 61 min 25 sec |

*Resin A gel time is 31 min 40 sec when cured at 150° C. with ARMA.

With Resins A–E, ARMA has about the same reactivity of the normal amine hardeners such as 3,3'-diaminodiphenyl sulfone. With Resin F, the curing reaction with 3,3'-diaminodiphenyl sulfone starts at a temperature at least 25° (C.) lower than with ARMA. This means that the storage stability of Resin F/ARMA mixtures will be considerably better than

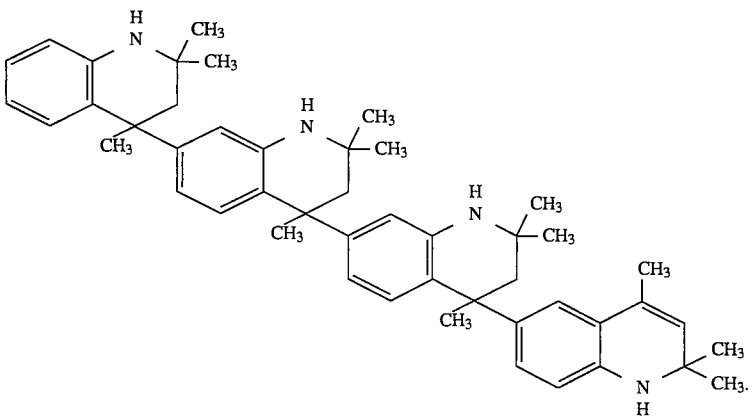

Resin F with other amine hardeners.

EXAMPLE 2

Effect of NH:Epoxy Ratio and Curing Conditions on $T_g$ of Epoxy Resin Cured with ARMA Dish castings (10 g) of epoxy resins/ARMA mixtures are prepared and cured under various time-temperature conditions. The $T_g$ values of the cured products are determined by DSC (10° C./min, RT-300° C. scans). The results are given in the tables with the results discussed below.

| Resin A Amine: | $T_g$ °C. after Curing | | | | | |
|---|---|---|---|---|---|---|
| Epoxy | 150° C. | | 160° C. | | 180° C. | |
| Ratio | 4 hrs | 6 hrs | 4 hrs | 6 hrs | 2 hrs | 4 hrs |
| 1:1 | — | 177 | 184 | 183.5 | — | 180 |
| 0.87:1 | 174 | 180 | 189 | 190.4 | — | 199 |
| 0.7:1 | 173.5 | 176 | 188 | 190.3 | 200 | 208 |
| 0.6:1 | — | — | — | — | — | 190.5 |

| Resin F Amine: | $T_g$ °C. after Curing | |
|---|---|---|
| Epoxy Ratio | 6 hrs at 180° C. | 2 hrs at 180° C. 2 hrs at 210° C. |
| 1:1 | 184 | — |
| 0.87:1 | 207 | 210 |
| 0.7:1 | 195.5 | — |
| 0.6:1 | 184 | — |

| Resin B Amine: Epoxy Ratio | $T_g$ °C. after Curing 4 hrs at 180° C. |
|---|---|
| 1:1 | 183 |
| 0.87:1 | 192.5 |
| 0.7:1 | 182 |

| Resin C Amine: Epoxy Ratio | $T_g$ °C. after Curing 4 hrs at 180° C. |
|---|---|
| 1:1 | 191 |
| 0.87:1 | 198 |
| 0.7:1 | 188 |
| 0.6:1 | 182 |

| Resin D Amine: Epoxy | $T_g$ °C. after Curing | |
|---|---|---|
| Ratio | 2 hrs at 180° C. | 4 hrs at 180° C. |
| 0.87:1 | 171 | 178 |

| Resin E Amine: Epoxy | $T_g$ °C. after Curing | |
|---|---|---|
| Ratio | 2 hrs at 180° C. | 4 hrs at 180° C. |
| 0.87:1 | 206 | 215 |

All of the compositions based on Resins A-F at amine:epoxy ratios from 0.6:1 to 1:1 cured at temperatures from 150° C. to 210° C. (for Resin F) give high $T_g$ values of 180°–210° C. It is contemplated that this is because of the contribution of the polycyclic bulky curing agent structure segments to networks stiffness and the polymerization of epoxy resins catalyzed by the tertiary nitrogen of the tetrahydroquinoline fragment of the curing agent at low amine:epoxy ratios. This is very important for practical use since it provides latitude for formulation and curing conditions.

Resin A and Resin E give the highest $T_g$ values among the difunctional resins even higher than Resin C and equal to that of multifunctional Resin F. In the case of Resin A it is contemplated that this is due to some stereochemical packing effects.

The optimum amine:epoxy ratio is generally 0.87:1 although Resin A gives the highest $T_g$ value at 0.7:1 when cured at 180° C.

Curing at lower temperatures such as 150°–160° C. results generally in $T_g$ values which are 10°–20° C. lower, but the lower curing temperatures may lead to very important advantages by causing less stresses and increasing the modulus of the matrix. For Resin F, there is only a negligible increase in $T_g$ by postcuring at 210° C. so curing at 180° C. appears sufficient.

Resin A can be successfully cured for 2 hours at 180° C. to give a $T_g$ value of 200° C.

EXAMPLE 3

Physical Properties of Resin A Cured with ARMA

The highest $T_g$ values, both wet and dry, are achieved with Resin A cured at the amine:epoxy ratio of 0.7:1 and cured at 180° C. The modulus (DMA and Hex) is lower and water absorption is higher with retention of modulus under hot/wet conditions being comparatively lower as well.

Resin A cured with ARMA has the best overall characteristic when cured at 160° C. with a amine:epoxy ratio of 0.7: 1. Although the $T_g$ value is lower than when cured at 180° C., the modulus (DMA and Flex) is higher as is retention of modulus under hot/wet conditions.

These results are seen in the table below.

| | Amine:Epoxy Ratio | | | |
|---|---|---|---|---|
| | 0.7:1 | 0.7:1 | 0.87:1 | 0.87:1 |
| | | Curing at | | |
| | 4 hrs 180° C. | 4 hrs 160° C. | 4 hrs 180° C. | 4 hrs 160° C. |
| $T_g$ °C. | | | | |
| Dry | 211 | 194 | 200 | 191 |
| Wet | 194 | 174 | 180 | 174 |
| DMA Modulus | | | | |
| ksi, RT Dry | 414 | 441 | 406 | 443 |
| 80° C. Wet | 348 | 395 | 370 | 388 |
| % Retention | 84 | 90 | 91 | 88 |
| 120° C. Wet | 323 | 364 | 343 | 358 |
| % Retention | 78 | 82.5 | 84.5 | 81 |
| 150° C. Wet | 298 | 335 | 314 | 330 |
| % Retention | 72 | 76 | 77.5 | 74.5 |
| % Water Absorption* | 2.03 | 1.56 | 1.51 | 1.51 |

*after 48 hours in boiling water

EXAMPLE 4

Physical Properties of Resin F Cured with ARMA

The properties of Resin F cured at 180° C., and later post-cured at 210° C. are very similar despite the fact that the latter material has higher $T_g$ values both dry and wet. Accordingly, curing of Resin F at 210° C. appears unnecessary. The material is more brittle. The only advantage is the considerably lower activity of Resin F.

Resin F is cured with ARMA with the amine:epoxy ratio of 0.87:1 with the physical properties for the cured product given in the table below.

| Curing Conditions | 180° C. for 2 hrs + 210° C. for 2 hrs | 180° C. for 6 hrs |
|---|---|---|
| $T_g$ °C. | | |
| Dry | 217 | 202 |
| Wet | 198 | 188 |
| DMA Modulus ksi | | |
| RT Dry | 485 | 490 |
| 80° C. Wet | 414 | 422 |
| % Retention | 85 | 86 |
| 120° C. Wet | 372 | 382 |
| % Retention | 76 | 76 |
| 150° C. Wet | 335 | 341 |
| % Retention | 69 | 70 |
| % Water Absorption | 1.56 | 1.39 |

EXAMPLE 5

Physical Properties of Various Resins Cured with ARMA

The properties of various resins cured at 180° C., are shown in the table below. The various resins are cured with ARMA with the amine:epoxy ratio of 0.87: 1.

| | Formulation | | | |
|---|---|---|---|---|
| | RESIN C ARMA | RESIN B ARMA | RESIN A ARMA/H1* | RESIN A ARMA/H2* |
| $T_g$ | | | | |
| Dry | 194 | 186 | 201 | 195 |
| Wet | 175 | 168 | 178 | 163 |
| DMA Modulus ksi | | | | |
| RT Dry | 449 | 460 | 381 | 437 |
| 80° C. Wet | 391 | 390 | 327 | 385 |
| % Retention | 87 | 85 | 86 | 88 |
| 120° C. Wet | 356 | 355 | 299 | 345 |
| % Retention | 79 | 77 | 77 | 79 |
| 150° C. Wet | 321 | 317 | 271 | 303 |
| % Retention | 71.5 | 69 | 71 | 69 |
| % Water Absorption | 1.59 | 1.30 | 1.89 | 2.23 |

*50/50 ratio based on active hydrogen content;
H1 is 3,5-diethyltoluenediamine.
H2 is 3,3'-diaminodiphenyl sulfone.

EXAMPLE 6

Flexural Characteristic of Various Epoxy Resins Cured with ARMA

| | | | Flexural (RT, Dry) | | |
|---|---|---|---|---|---|
| Epoxy Resin | NH: Epoxy Ratio | Curing Conditions | Modulus ksi | Strength ksi | Elongation % |
| Resin A | 0.87 | 180° C., 4 hrs | 386 | 15.6 | 5.0 |
| | 0.87 | 160° C., 4 hrs | 430 | 16.5 | 4.5 |
| | 0.7 | 180° C., 4 hrs | 368 | 15.8 | 5.0 |
| | 0.7 | 160° C., 4 hrs | 420 | 17.5 | 5.2 |
| Resin F | 0.87 | 180° C., 2 hrs plus 210° C., 2 hrs | 430 | 12.6 | 3.0 |
| | 0.87 | 180° C., 6 hrs | 451 | 13.9 | 3.3 |
| Resin B | 0.87 | 180° C., 4 hrs | 418 | 18.0 | 5.6 |
| Resin C | 0.87 | 180° C., 4 hrs | 406 | 15.8 | 5.0 |
| Resin A ARMA/H2* | 0.87 | 180° C., 4 hrs | 385 | 18.3 | 8.0 |
| Resin A ARMA/H1* | 0.87 | 180° C., 4 hrs | 353 | 15.0 | 6.4 |

*50/50 ratio based on active hydrogen content;
H1 is is 3,5-diethyltoluenediamine.
H2 is 3,3'-diaminodiphenyl sulfone.

EXAMPLE 7

Properties of Various Epoxy Resins Cured with ARMA

The properties of various resins cured at 180° C. with ARMA are shown in the table below.

| | Formulation | | |
|---|---|---|---|
| | RESIN G ARMA | RESIN A ARMA | RESIN F ARMA |
| NH:Epoxy ratio | 0.8 | 0.7 | 0.87 |
| $T_g$ | | | |
| Dry | 205 | 200 | 202 |
| Wet | 188 | 180 | 188 |
| DMA Modulus ksi | | | |
| RT Dry | 510 | 441 | 490 |
| 80° C. Wet | 460 | 395 | 422 |
| % Retention | 86 | 89.5 | 86 |
| 120° C. Wet | 385 | 344 | 382 |
| % Retention | 75.5 | 82.5 | 78 |
| 150° C. Wet | 345 | 335 | 347 |
| % Retention | 67.5 | 76 | 70 |
| % Water Absorption | 1.5 | 1.5 | 1.4 |
| RT Flexural Modulus, ksi | 435 | 420 | 451 |
| Strength, ksi | 14.5 | 17.5 | 13.9 |
| Strain, % | 3.6 | 5.2 | 3.3 |

Based on the data given in the examples above, it is shown that oligomeric 1,2-dihydro-2,2,4-trimethylquinolines (OTMQ) which find utility as antioxidants for rubbers and plastics, are also valuable curing agents for a wide variety of epoxy resins. Even with epoxy resins based on bisphenol A, the OTMQ curing agents give $T_g$ values in excess of 200° C. (dry) and 180° C. (wet), low water absorption and excellent retention of physical properties under hot/wet conditions. This combination with low cost and comparatively low toxicity makes OTMQ especially attractive and of economic interest.

New epoxy resin systems may be used as matrix resins where performance similar to that of Resin G can be expected with these new curing agents, but with considerably lower cost.

OTMQ are commercially available as water dispersions for use with rubber latexes. It is contemplated that combinations of these with water emulsions or dispersions of epoxy resins may result in valuable products for fiber sizing and for primers for surfaces since OTMQ are known as efficient corrosion inhibitors. It is expected that OTMQ can improve fiber-rubber interfaces because of the good compatibility of OTMQ with rubber. OTMQ is expected to be used in powder coating formulation because of their corrosion inhibiting properties.

It is expected that the epoxy resin/OTMQ compositions will find utility in adhesives, tooling, encapsulation, electrical applications and many other areas.

What is claimed is:

1. A curable epoxy resin composition which comprises
   (a) an epoxy resin having at least two epoxy groups and an epoxy equivalent weight of 125 to 430, and
   (b) an effective curing amount of a mixture of homo-oligomeric 1,2-dihydro-2,2,4-trimethylquinolines (OTMQ) wherein the effective amount of hardener of component (b) is from 0.5 to 1.5 equivalents of —NH— for each equivalent of epoxy moiety.

2. A composition according to claim 1 wherein the epoxy resin of component (a) is selected from the group consisting of glycidyl ethers of polyhydric phenols, of aliphatic and cycloaliphatic alcohols, of 4,4'-dihydroxydiphenyl sulfone, of dihydroxynaphthalene; of the condensation products of phenols and cresols with formaldehyde; the glycidyl ethers of halogenated mono-, di- and polynuclear phenols; glycidylated amines, aminophenols and amides; glycidylated polyacids; cycloaliphatic epoxy resins having epoxy groups attached to cyclohexane or cyclopentane rings; and mixtures thereof.

3. A composition according to claim 1 wherein the epoxy resin of component (a) comprises the diglycidyl ether of bisphenol A, the diglycidyl ether of bisphenol F, the diglycidyl ether of hydroquinone, of resorcinol, of catechol, of 2,5-dihydroxynaphthalene or of 9,9-bis( 4-hydroxyphenyl)fluorene; the tetraglycidyl ether of 3,3,3',3'-tetramethyl-1,1'-spiro-bisindane- 5,5',6,6'-tetraol; the tetraglycidyl derivatives of methylenedianiline, of m-phenylenediamine, of 1,4-di($\alpha,\alpha$-dimethyl-4-aminobenzyl)benzene, of 1,4-di-($\alpha,\alpha$-dimethyl-3-methyl-4-aminobenzyl)benzene or of 3,3'-diethyl-4,4'-diaminodiphenylmethane; the triglycidyl derivatives of 4-aminophenol or 3-methyl-4-aminophenol; the diglycidyl derivative of aniline; di(2-glycidyloxy-1-naphthyl)methane, di(2,5-diglycidyloxy- 1-naphthyl)methane or 2-glycidyloxy-1-naphthyl-2',5'-diglycidyloxy-1'-naphthyl-methane.

4. A composition according to claim 3 wherein the epoxy resin of component (a) is the diglycidyl ether of hisphenol A, the diglycidyl ether of bisphenol F, the tetraglycidyl derivative of 3,3'-diethyl-4,4'-diaminodiphenylmethane or mixtures thereof.

5. A product produced by curing the epoxy resin composition of claim 1 which is a composite, adhesive, molding compound, potting compound, coating or matrix resin.

6. A curable epoxy resin composition which comprises
   (a) an epoxy resin having at least two epoxy groups and an epoxy equivalent weight of 125 to 430; and
   (b) an effective curing amount of a mixture of
      (i) a mixture of homo-oligomeric 1,2-dihydro-2,2,4-trimethylquinolines (OTMQ), and
      (ii) an aromatic, cycloaliphatic or aliphatic polyamine containing at least two NH groups,
   where the OTMQ content of component (b) is 5 to 95% by weight of the mixture of component (b) and wherein the effective amount of hardener of component (b) is from 0.5 to 1.5 equivalents of —NH— for each equivalent of epoxy moiety.

7. A composition according to claim 6 wherein the epoxy resin of component (a) is selected from the group consisting of glycidyl ethers of polyhydric phenols, of aliphatic and cycloaliphatic alcohols, of 4,4'-dihydroxydiphenyl sulfone, of dihydroxynaphthalene; of the condensation products of phenols and cresols with formaldehyde; the glycidyl ethers of halogenated mono-, di- and polynuclear phenols; glycidylated amines, aminophenols and amides; glycidylated polyacids; cycloaliphatic epoxy resins having epoxy groups attached to cyclohexane or cyclopentane rings; and mixtures thereof.

8. A composition according to claim 6 wherein the epoxy resin of component (a) comprises the diglycidyl ether of bisphenol A, the diglycidyl ether of hisphenol F, the diglycidyl ether of hydroquinone, of resorcinol, of catechol, of 2,5-dihydroxynaphthalene or of 9,9-bis( 4-hydroxyphenyl)fluorene; the tetraglycidyl ether of 3,3,3',3'-tetramethyl-1,1'-spiro-bisindane- 5,5',6,6'-tetraol; the tetraglycidyl derivatives of methylenedianiline, of m-phenylenediamine, of 1,4-di($\alpha,\alpha$-dimethyl-4-aminobenzyl)benzene, of 1,4-di-($\alpha,\alpha$-dimethyl-3-methyl-4-aminobenzyl)benzene or of 3,3'-diethyl-4,4'-diaminodiphenylmethane; the triglycidyl derivatives of 4-aminophenol or 3-methyl-4-aminophenol; the diglycidyl derivative of aniline; di(2-glycidyloxy-1-naphthyl)methane, di(2,5-diglycidyloxy- 1-naphthyl)methane or 2-glycidyloxy-1-naphthyl-2',5'-diglycidyloxy-1'-naphthyl-methane.

9. A composition according to claim 8 wherein the epoxy resin of component (a) is the diglycidyl ether of bisphenol A, the diglycidyl ether of bisphenol F, the tetraglycidyl derivative of 3,3'-diethyl-4,4'-diaminodiphenylmethane or mixtures thereof.

10. A composition according to claim 6 wherein the amine of component (ii) is 4,4'-diaminodiphenylmethane, 4,4'-diaminodiphenyl sulfone, 3,3'-diaminodiphenyl sulfone, m-phenylenediamine, p-phenylenediamine, toluenediamine, diaminonaphthalene, 1,2-diaminocyclohexane, 4,4'-diaminodicyclohexylmethane or 3,3'-dimethyl-4,4'-diaminodicyclohexylmethane.

11. A product produced by curing the epoxy resin composition of claim 6 which is a composite, adhesive, molding compound, potting compound, coating or matrix resin.

* * * * *